March 14, 1961 K. O. SISSON ET AL 2,974,542
MULTIPLE SPEED TRANSMISSION
Filed May 28, 1958 7 Sheets-Sheet 1

Fig. 1

INVENTORS
KENNETH O. SISSON
DANIEL J. BARBULESCO
BY Edwin S. Dybuig
THEIR ATTORNEY March 14, 1961 K. O. SISSON ET AL 2,974,542
MULTIPLE SPEED TRANSMISSION
Filed May 28, 1958 7 Sheets-Sheet 4

INVENTORS
KENNETH O. SISSON
DANIEL J. BARBULESCO
BY Edwin S. Dybvig
THEIR ATTORNEY March 14, 1961 — K. O. SISSON ET AL — 2,974,542
MULTIPLE SPEED TRANSMISSION
Filed May 28, 1958 — 7 Sheets-Sheet 5

INVENTORS
KENNETH O. SISSON
DANIEL J. BARBULESCO
BY Edwin S. Dybvig
THEIR ATTORNEY

INVENTORS
KENNETH O. SISSON
BY DANIEL J. BARBULESCO

THEIR ATTORNEY

United States Patent Office 2,974,542
Patented Mar. 14, 1961

2,974,542

MULTIPLE SPEED TRANSMISSION

Kenneth O. Sisson, Dayton, and Daniel J. Barbulesco, West Carrollton, Ohio, assignors to General Motors Corporation, Detroit, Mich., a corporation of Delaware Filed May 28, 1958, Ser. No. 738,330

9 Claims. (Cl. 74—665)

This invention relates to a domestic appliance and more particularly to a driving arrangement for a washing machine.

With the increased improvement and use of the so-called wash and wear fabrics, it has become apparent that the various agitation types and spinning actions imposed upon these fabrics by the conventional clothes washer have a marked effect on the washing result. If the spinning operation used to wring or centrifuge the water from the fabric is too high, wrinkles will be set in the fabric which are extremely difficult to remove. Severity of agitation also creates unwanted wrinkling or wear effects on wash and wear clothing. With the continued advancement in fabric development, it is now apparent that conventional washing methods are inadequate. Washing machine design should now include a degree of flexibility in its operating cycle, and the operator given the choice of multiple agitating and/or spinning speeds which may be selected in accordance with the fabric to be washed.

Accordingly, it is a general object of this invention to provide a washing machine having a plurality of agitation speeds and spin or clothes centrifuging speeds.

A further object of this invention is to provide a multi-speed washing and spinning action with a single speed reversible motor.

A more specific object is the inclusion of driving members rotatably mounted on a motor shaft and between which a clutch member is adapted for selective engagement with one or the other of said driving members.

A specific object of this invention is to provide a driving arrangement for a washing machine mechanism adapted to produce an agitation when rotated in one direction, and a spinning or centrifuging when operated in the opposite direction, wherein a first driving member may be selected for a first spin speed; a second driving member may be selected for a second spin speed and a first agitation speed; and a centrifugal clutch, drivingly connected to said second drivingly member, may be selected to produce a second speed agitation.

Another object of this invention is to provide a slip connection between the second driving member and the centrifugal clutch to prevent damaging shocks to the driving arrangement.

It is also a specific object of this invention to provide a washing machine mechanism adapted to produce a plurality of agitating and spinning speeds wherein the agitation is produced through a solid shaft which effects a 1.75" stroke of the agitator within the washing machine.

It is also an object of this invention to provide a driving arrangement for a multi-speed washing machine mechanism wherein a spinning operation is always started in low speed.

A further object of this invention is to provide an improved housing for the agitation producing spherical bearing.

Further objects and advantages of the present invention will be apparent from the following description, reference being had to the accompanying drawings wherein a preferred embodiment of the present invention is clearly shown.

Figure 1:
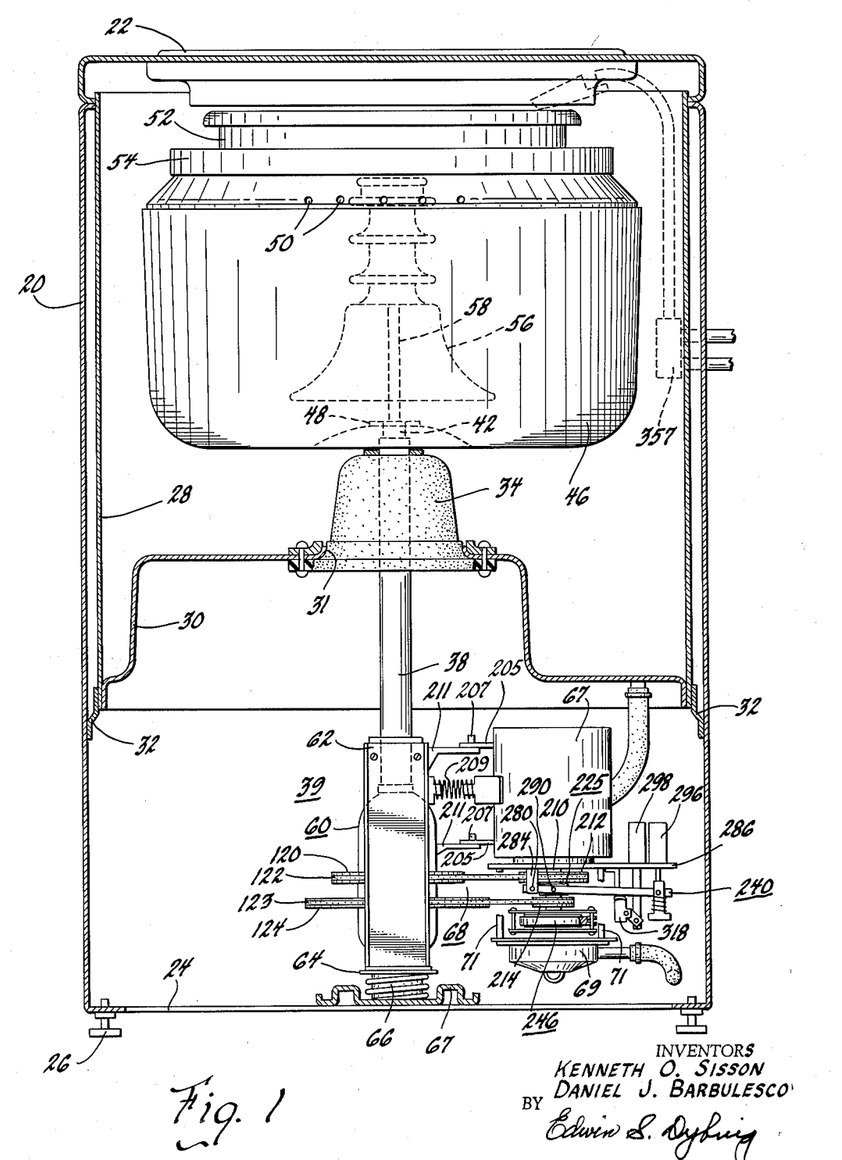
Figure 1 is an elevational view, with parts broken away, of a washing machine provided with this invention.

Referring now to the drawings and more particularly to Fig. 1, there is shown an outer cabinet shell 20 provided with a lid 22. This outer cabinet shell 20 is formed with a base flange 24 on which are provided adjustable feet 26. Within the cabinet shell 20 there is provided a catch basin or water container having a vertical tubular portion 28. The vertical tubular portion 28 connects to a bottom portion 30 having a raised center provided with an opening 31. This bottom portion 30 is supported by several brackets 32 extending between the vertical tubular portion 28 and the cabinet shell 20.

Extending over and secured to the opening 31 in the raised center of the bottom portion 30 is a conical rubber support member 34, the upper end of which lockingly engages a tubular support housing 38 of the washing machine agitate and spin mechanism shown generally at 39. Rotatably mounted on a bearing 40 (Fig. 2) within the tubular support housing 38 is a tubular tub spin shaft 42, the upper end of which is connected and sealed to a washing machine tub 46, as indicated at 48. The tub 46 is provided with a series of apertures 50 at the upper terminus of the tub sidewall and an upper rim or tub access collar 52, of reduced diameter, which prevents the loss of the clothes during the spinning operation. To reduce the vibrations of the mechanism during spinning of the tub, there is provided a ballast ring 54 mounted upon the top of the tub 46 surrounding its opening, which is filled with ballast material such as iron or lead.

Within the tub 46 an agitator 56 is affixed to the top of an agitate shaft 58. The shaft 58 is of a solid metal construction for strength and extends downwardly through the concentrically arranged tubular support housing 38 and the tubular spin shaft 42 into a rotatably mounted mechanism drive housing 60 of the agitate and spinning mechanism 39. Since the support housing 38 is the primary means of vertical support for the washing machine mechanism, the housing 38 is affixed to the flexible cone member for transferring the weight carried to the cabinet 20. The flexible cone member or hat 34 is effective to locate the tub 46 within the cabinet 20 and to absorb the vibrations originating within the tub or in the agitate and spin mechanism. For additional dampening adjacent the lower end of the washing machine mechanism 39, snubber brackets 62 are bolted or attached to two oppositely arranged support brackets welded to the stationary support housing 38 at a lower end thereof. The brackets 62 extend downwardly around the rotatable housing 60 and out of contact therewith and are connected to a snubber plate 64 as at 65. The plate 64 carries a pin 63 which projects into any suitable resilient dampening means 66 positioned with respect to the base 24 of the washing machine on a cross brace 67. Thus, an arrangement is provided wherein a washing machine mechanism 39 is suspended resiliently at the upper end thereof from a centrally located bulkhead 30 and guarded against lateral movement at the lower end thereof by a snubbing arrangement 62, 64, 66. With the foregoing arrangement and the washing machine mechanism to be described hereinafter, a rotation of the rotatable housing 60 in one direction serves to impart a vertical reciprocation of shaft 58 which produces, by means of an agitator 56, a washing action within the tub 46. By rotating the housing 60 in an opposite direction, rotational motion is transmitted by means of shaft 42 to the shaft attached tub 46 and a spinning action or clothes wringing operation is effected.

Other elements of the washing machine include a reversible motor 67 adapted to rotate the mechanism housing 60 through a belt driving arrangement, shown generally at 68. To drain the water collecting above the bottom partition 30, a pump 69 driven by motor 67 and suspended a spaced distance below the motor on rods 71, is utilized to pump water from the washing machine.

Figure 2:
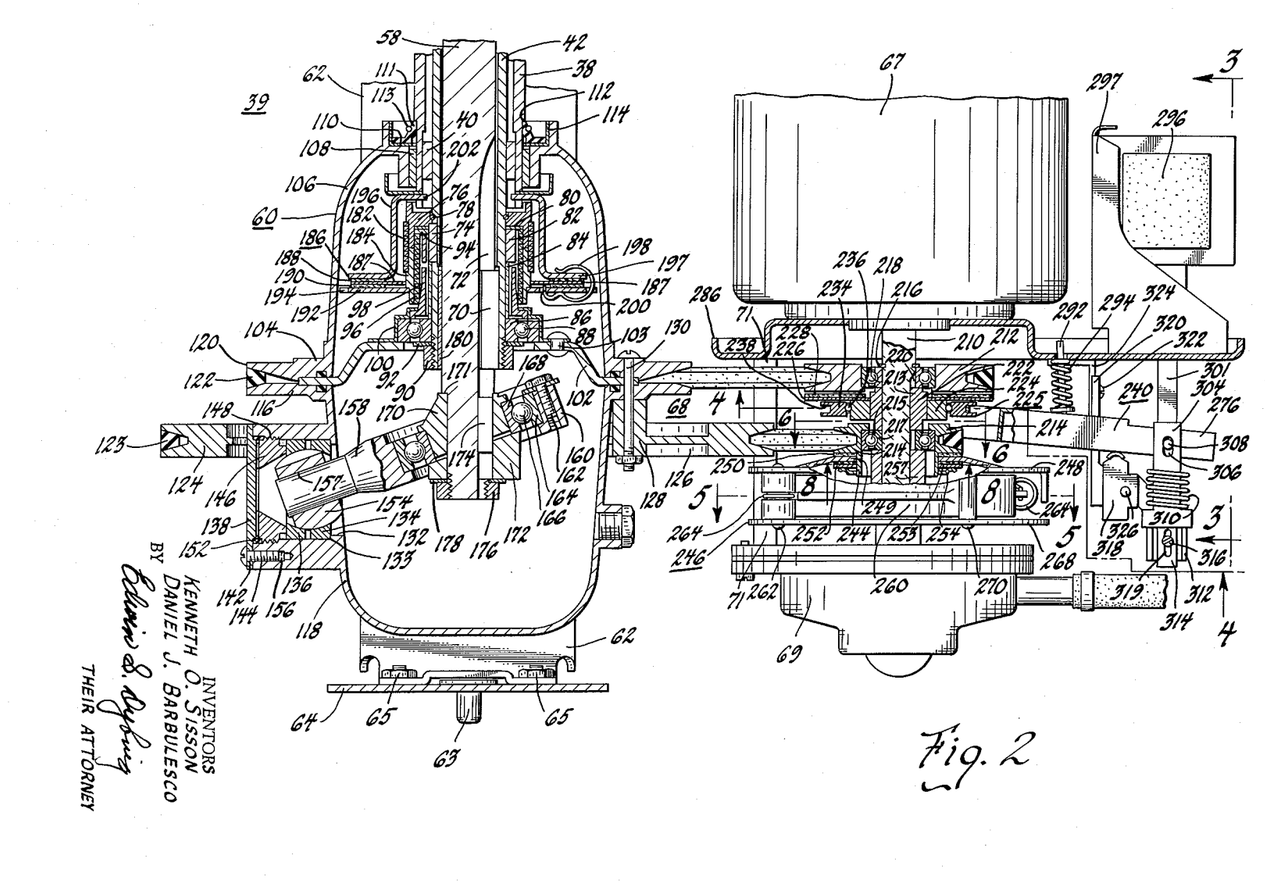
Figure 2 is an enlarged sectional view of the novel washing mechanism multi-speed driving arrangement.

To better understand the improved agitate and spinning mechanism 39, reference may now be had to Fig. 2. The lower portion of tubular shaft 42 is provided with a key 70 fitting into an extended key slot 72 formed at one end of the inner agitate shaft 58 to permit a relatively vertically slidable connection between the shafts 42 and 58. Another key 74 provides a connection with an annular clutch member 76 mounted upon the outside of shaft 42. This clutch member 76 is retained on its upper side by a ring 78 fitting in a notch on the outer surface of the shaft 42 and lodged within a recess in the clutch member 76. The bottom of the member 76 rests against a clutch torque spring retainer 80 also surrounding the shaft 42 and in engagement with a clutch torque spring collar 82, both the retainer 80 and the collar 82 being connected to shaft 42 by key 74. A spacer sleeve 84 which rests on the inner race 86 of a ball bearing 88 completes the assembly of parts 74, 76, 80 and 82. This assembly may then be locked in place on shaft 42 by a nut 90 on the threaded end of shaft 42 and by a suitable lock washer 92. As aforesaid, the key 74 engages a notch or key slot in the collar 82 to prevent relative rotation between the collar 82 and shaft 42. The collar 82 is formed with a second notch at its upper end to receive a radially inwardly turned end portion 94 at the upper end of a wound spring clutch member 96. The clutch spring 96 is wound in such a direction that when a tapered hub 98 is turned in the direction to produce an agitating action, the spring 96 will be unwound. When in an unwound or relaxed state, the spring 96 will not grip hub 98 and thus the hub will rotate freely within the spring. Since the selected agitating or spinning action is initiated by the selective rotation of housing 60, structure is necessary to transmit the rotational motion of housing 60 to hub 98. In this regard the hub 98 is affixed to a cup member 100 which rests on the outer race of bearing 88. In driving and support relationship to the cup 100 and attached hub 98 is a mechanism housing support 102 to which the cup member is attached by any suitable means such as by the illustrated rivet 103.

The outer periphery of the plate 102 is notched and held against the bottom of a peripheral flange 104 of an upper portion 106 of the rotatable housing 60. The housing portion 106 encloses the clutch mechanism and overlies a plain bearing 108 at its upper end which bears against the lower portion of the tubular housing support 38, as shown in Fig. 2. Above the bearing 108 there is provided a shaft seal 110 formed of an inner ring portion 111 of rubber-like material around which a light tension spring 113 is placed to hold the portion 111 in contact with the outer surface of the tubular support housing 38. The seal 110 is retained against moving upwardly on shaft 38 by an annular shaft shoulder 112 and against moving downwardly by a seal retainer 114 which rests in a cavity at the top of the rotatable housing portion 106.

The notched edge of the support plate 102 is held in place against the bottom flange of the upper housing member 106 by the upper flange 116 of the lower rotatable housing portion 118. The flange around the bottom of the upper housing member 106 is shaped to form one side of a V-grooved pulley 120 while the flange around the top of the lower housing 118 is shaped to provide the second side of the V-grooved pulley. The pulley 120 thus formed is adapted to receive a conventional V-belt 122 by which the rotatable housing 60 is rotated to produce a high speed spinning action of tub 46. A second and larger pulley 124 is pre-cast of any suitable material and provided with a large central opening 126 to permit the pulley 124 to pass over the bottom housing portion 118. Several spacers 128 are cast integral with pulley 124 about the inner periphery thereof and drilled to receive a mounting bolt 130 with which the pulley 124 is attached to the rotatable housing 60. This connection serves also to secure the flanges 104, 116 of housing portions 106, 118, respectively, in attached relationship. The spacers 128 are cast in a manner to project on one side only of pulley 124. Thus, the pulley 124 may be held a spaced distance from pulley 120 as shown in Fig. 2, or immediately adjacent thereto if placed over the rotatable housing 60 in reverse fashion. This construction permits a single pulley element to be adapted to differing washing machine driving arrangements, wherein a lesser spread between pulleys is necessary.

The lower housing portion 118 at one side is provided with a recess 132 which receives an inner spherical socket member 134 and an outer spherical socket member 136, which are clamped together against an inner shoulder of recess 132. To locate the socket members 134 and 136 within the recess 132, a novel mounting arrangement is utilized and will be explained with reference to Fig. 9. The cover assembly is comprised of a cover 138 having a rib 140 diametrically formed on the cover and three ports 142 for receiving a mounting bolt 144. An internal castellated nut 146 is adapted to thread within an outer opening 148 in the recess 132. The nut 146 is formed with a plurality of castellations or slots 150 along an outer edge thereof. The cover assembly is completed by a seal ring 152 adapted to be interposed between the nut member 146 and the outer cover 138. The spherical socket members 134, 136 are arranged to hold a spherical bearing member 154 (Fig. 2). Thus, to assemble the members in recess 132, the inner socket 134 is placed within the recess 132 against the inner shoulder 133.

Figure 9:
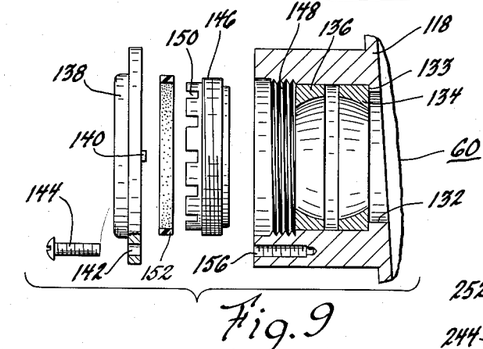
Figure 9 is an exploded view of the castellated locking arrangement for the spherical bearing housing.

The spherical bearing member 154 is placed within the inner socket and retained by the installation of the outer socket member 136. The nut 146 is inserted adjacent the socket member 136 and threaded into the opening 148 until the desired amount of tension is provided on the spherical bearing member 154. The cover 138 and seal 152 are placed at the outer end of the recess with the bolt holes 142 in the cover aligning with threaded apertures 156 in the wall of the recess and with the rib 140 interlocked within the desired castellations 150. The bolts 144 are then tightened to provide an assembly which is effective to provide a constant amount of tension on the bearing member 154.

A spherical bearing member 154 provides a pivotal connection between the lower housing member 118 and an extending pin 158 which slides within a cylindrical bearing surface 157 in the spherical bearing member 154. The extending pin or rod 158 is in the form of a projection from a ring-shaped member 160 to which is clamped, by three bolts 162, the outer race 164 of a ball bearing 166. The inner race 168 of the ball bearing 166 is mounted upon an upper angular support member 170 against the shoulder 171 provided by the reduced end portion of the inner agitate shaft 58. The inner race 168 is held in place by a complementary lower angular support member 172 set at the same angle to the axis of shaft 58 as the upper member 170. Member 172 is keyed to the end of shaft 58 by a key 174, and the members 170, 168 and 172 are locked in place by a nut 176 which is threaded onto the bottom of the stub end of the shaft 58 and locked thereto by a lock washer 178. A plain sleeve bearing 180 serves to locate shaft 58 within shaft 42 and provides a bearing surface for the vertical reciprocation of shaft 58.

The clutch mechanism includes a second wound spring clutch member 182 which is wound so as to grip internally. The upper end of this wound spring clutch member 182 is supported upon an outer spring engaging surface of the clutch member 76 while the lower end of the wound spring clutch member 182 is supported upon the outer spring engaging surface of an upstanding sleeve portion 184 of a drive shaft torque plate assembly 186. The sleeve 184 is bonded directly to a friction disc portion 187 of the torque plate assembly 186 and has bonded thereto friction facings 188, 190 upon its upper and lower surfaces. Below the friction surface 190 there is provided a brake plate 192 which is provided with notches 194 on its periphery which are engaged by tongues (not shown) extending downwardly from a horizontal flange 197 of the inverted cup-shaped member 196. A plurality of generally C-shaped spring members 198 having a projection 200 extending into an inner notch or aperture in the brake plate 192 are provided for applying a limited pressure to the sandwiched relationship of parts 197, 188, 187, 190 and 192. The upper portion of the inverted cup-shaped member 196 is formed with a plurality of inwardly extending tongues 202 which engage notches provided in the lower end of the tubular housing support member 38. This arrangement, therefore, provides a friction device in which the element 196 and flange 197, spring 198 and brake plate 192 are locked to the normally stationary housing member 38 so that they do not turn with the rotatably driven housing 60.

The inverted cup-shaped friction element 196, through the friction surfaces or washers 188, 190 on disc 187, is connected to the upstanding sleeve portion 184 of the drive shaft torque plate assembly 186. In this relationship, the member 184 will be connected to the clutch element 76 whenever the element 76 rotates in such a direction as to wind or tighten the wound spring clutch member 182 tightly upon the radially outer spring engaging surfaces of the members 76 and 184. The member 184 is also connected to the clutch 76 when the wound spring clutch member 96 is unwound or relaxed so that the outer surface of the wound spring clutch member 96 then engages the radially inner spring engaging surfaces of the members 76 and 184. The wound spring clutch members 182 and 96 are both wound so that their natural tendency is to engage with their inner spring engaging surfaces. They are arranged so that when the hub 98 is turned in such a direction as to unwind the spring 96, the wound spring clutch member 182 will be wound tightly on the outer spring engaging surfaces of parts 76 and 184. At the same time, the unwinding of the spring 96 will cause it to engage the inner spring engaging surfaces of the elements 76 and 184. This will connect the tub or spin shaft 42 to the stationary support housing 38 as follows. The spin shaft 42 will be connected through key 74 to clutch member 76, the wound spring clutch members 96 and 182 to the sleeve portion 184 of drive shaft torque plate assembly 186, and the friction elements 188 and 190 to the inverted cup-shaped housing 196 which is fixed to stationary tubular support housing 38. Key 70, of course, prevents agitate shaft 58 from rotating relatively to spin shaft 42.

The tub or spin shaft 42 and the agitator shaft 58 are thereby prevented from rotating while the housing 60 is being rotated in a direction to relax spring 96. With the shaft 58 locked against rotation, the arm 158 of the rocking mechanism or pivoted member 160 moves in a circle about the shaft 58 thereby forcing the free or shaft attached end of this pivoted member 160 downwardly and back once every revolution. This motion is enforced by the fixed angular mounting of the inner race 168 of the ball bearing 166 upon the agitator shaft 58. The upward and downward movement of the pivoted member 160 reciprocates the agitator shaft 58 and the agitator 56 through a stroke of about 1.75" for agitating the washing liquid in the tub 46.

As aforesaid, when the driving hub 98 is turned in the direction to unwind the wound spring 96 and to wind the wound spring clutch member 182, the tubular tub or spin shaft 42 will be connected through key 74, the clutch element 76, the wound spring clutch members 182 and 96, to the brake plate 187 frictionally connected with the elements 196 and 192 which are locked to the normal stationary tubular housing member 38. This acts as a friction braking device to hold the tub 46 stationary.

When the housing 60 and the driving hub 98 are turned in the opposite direction to wind inwardly or tighten the wound spring clutch member 96 upon the outer spring engaging surface of the hub 98 and sleeve 82, there is provided a driving connection for spinning tub 46. The member 82 is keyed to the shaft 42 by key 74 and subsequently to the shaft 58 by means of key 70. At the same time, the wound spring clutch member 182 is unwound to disengage the members 76 and 184. The brake plate 187, thus disengaged from the rotating parts, remains motionless in the sandwiched braking connection and the clutching mechanism is adapted for a tub spinning operation.

When the driving motor 67 is deenergized at the termination of the spinning operation, the wound spring clutch 98 will be unwound to provide a connection from the tub or spin shaft 42 through the key 74, the clutch member 76 and both wound spring clutch members 98 and 182 to the friction disc or plate 187. The frictional engagement between the friction disc 187, brake plate 192 and stationary flanged cup member 196 imparts a braking effect on the rotation of spin shaft 142 which will tend to overcome the inertia of the spinning tub 48. During the tub deceleration the braking effect just described is effective to retard the rotation of tub 46, shafts 42 and 58, but is not directly operative to slow the rotation of housing 60 and its attached drive belt arrangement. Thus, any relative rotational motion between the slowly decelerating shafts 42 and 58 and the comparatively rapidly decelerating housing 60 will initiate a vertical reciprocation of shaft 58 during deceleration from tub spin speeds. At high speeds this could be undesirable. To overcome the problem of relative rates of deceleration, a centrifugally actuated brake has been designed which may be included within housing 60 as more fully disclosed in my copending application S.N. 738,362 filed concurrently herewith.

Further information as to the operating details of this agitating and spinning mechanism are set forth in the patent to Sisson, 2,758,685, issued August 14, 1956, wherein a substantially similar mechanism is disclosed. The above description, however, is believed to suffice in setting forth a washing machine mechanism which produces a reciprocation of an agitator 56 within a tub 46 when a portion of the mechanism is rotated in one direction and which produces a spinning of a spin shaft 42 and tub 46 when rotated in the opposite direction.

It should now be apparent that the speed with which the agitator 56 is reciprocated and the tub 46 is rotated depends solely on the speed with which the rotatable drive housing 60 is motivated. Furthermore, the multiple speeds which are now desirable in efficiently laundering the new synthetic fabrics require agitating and spinning speeds which must be selectable for the fabric being washed. Research in the art of washing as hereinbefore described has determined that an agitation speed of 220 strokes per minute, with a stroke of 1.75" is satisfactory to wash the most delicate fabrics. For regular clothing or material, an agitate speed of 330 strokes per minute is adequate, the stroke also being 1.75". The more vigorous stroke or pulsation is necessary to remove the grime from work clothes and the like, whereas the lighter, more delicate washing action imparts less wear and strain to the laundered fabrics. In the spinning action incorporated in conventional washing machines, to wring the wash and rinse water from the clothes, selectable speeds are also desirable. For regular wash loads, a fast spin of 850 tub revolutions per minute provides the most efficient moisture removal from the washed clothes. However, a spin speed of this nature will impart wrinkles to certain delicate fabrics, which are hard to remove and thus very undesirable. To prevent this, investigation has ascertained that a spin speed of 330 r.p.m. promotes the desired result. In any spin situation, however, the preferable design of washing machine transmissions requires that the spin tub be energized to rotate in a slow speed condition until the inertia of the accelerating tub, clothing and water is sufficient to limit undue strain on the drive motor of the washing machine. It is to these ends which the following driving arrangement for multiple-speed washing machines is directed.

As best seen in Fig. 1, the drive motor 67 is arranged in vertical fashion with its motor shaft 210 (Fig. 2) parallel to the tubular support shaft 38 of the agitating and spinning mechanism 39. The snubbing bracket 62 carries horizontally extending motor support brackets 211 having upstanding pins 207 for pivotally receiving support arms 205 extending into engagement therewith from the casing of motor 67. Thus, the motor is pivotally mounted to snubber bracket 62 and may pivot inwardly to facilitate installation of the driving V-belts 122 and 123. A spring 209 biases the bracket 62 and motor 67 in opposite directions to maintain a constant tension on the V-belts 122, 123.

Figure 7:
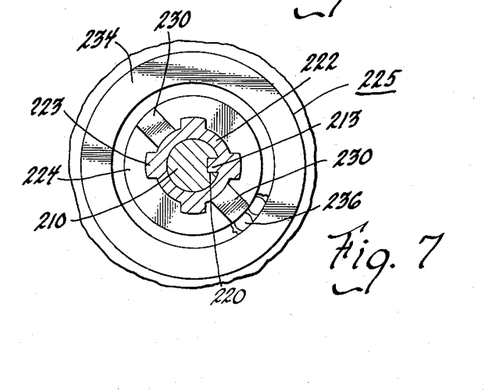
Figure 7 is a sectional view taken along line 6—6 looking in the opposite direction from the arrows to show the dog-engaging means of the shifter clutch.
Figure 8:
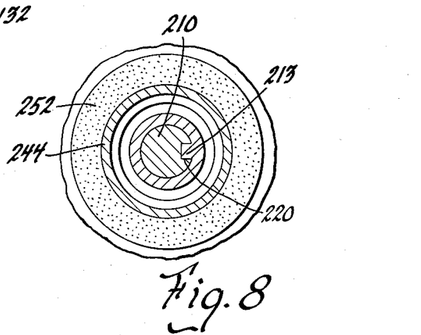
Figure 8 is a sectional view taken along line 8—8 in Fig. 2 to show the precautionary slip connection between the centrifugal clutch housing and the agitate pulley.

The motor shaft 210 has arranged thereon a selectively operable pulley system which includes a drive member or pulley 212 in coplanar relationship to mechanism housing pulley 120 and a second drive member or pulley 214 in coplanar driving relationship to affixed driving pulley 124 on rotatable housing 60. The pulley system is arranged along the motor shaft 210 and fixed axially at the upper end by a snap ring 216. Abutting against the ring 216 is the inner race of a bearing 218 which is adapted to relatively rotatably mount the pulley 212 to the motor shaft 210. A key slot 220 extends axially along the shaft 210 to receive an inner spline or rib 213 of a spacer guide 222 thereby to fix the guide 222 for rotation with the shaft. The spacer guide 222 is formed with axially directed splines 223 (Fig. 4) on its outer periphery which serve to transfer the rotational motion of shaft 210 to an inner race 224 of a selectively operable clutch member, shown generally at 225. The axial disposition of the splines, however, freely permits the vertical movement of the inner race 224 relative to the spacer guide 222. Fastened to the inner race 224 is a disc or plate 226 to which a layer of friction material 228 is bonded for improving the driving relationship between the plate 226 and the bottom surface of driving pulley 212. For selectively driving the pulley 214, the inner race 224 is formed with two protuberances or dogs 230 (Fig. 7) which cooperate with upwardly extending bosses 232 formed integrally with the pulley 214. Thus, when the shifter clutch 225 is raised, the rotational motion of motor shaft 210 is transferred to drive pulley 212 through spacer guide 222 keyed to the motor shaft, the inner race 224 splined to the outer periphery of spacer 222, and frictionally faced plate 226 to frictionally drive the pulley 212. With the selector clutch 225 in a lowered position, pulley 214 is driven from motor shaft 210, spacer 222 keyed to shaft 210, inner race 224 splined to spacer 222 and dogs 230 which drivingly engage the protuberances or bosses 232 on the pulley 214. The pulley 214, it will be noted, is mounted for rotation relative to shaft 210 on a bearing 215, the inner race 217 of which overlies the shaft 210. Completing the clutch assembly 225 is a shifter bearing 234 which serves also as the outer race for a bearing 236. The member 234 is formed with an annular groove 238 adjacent one end of a shifter fork, shown generally at 240. To reduce wear on the annular groove 238 by minimizing the rotational movement of bearing member 234, an annular spring 242 having end tabs 243 is adapted to lie within the groove 238. This spring 242 tightens around the shifter bearing 234 whenever the bearing moves relatively to the engaging end of the shifter fork 240 and thus minimizes the amount of rotation of the bearing member 234.

To secure a plurality of driving speeds from a single pulley, the pulley 214 includes a depending annular flange 244 adapted to support a centrifugal clutch, shown generally at 246.

Figure 5:
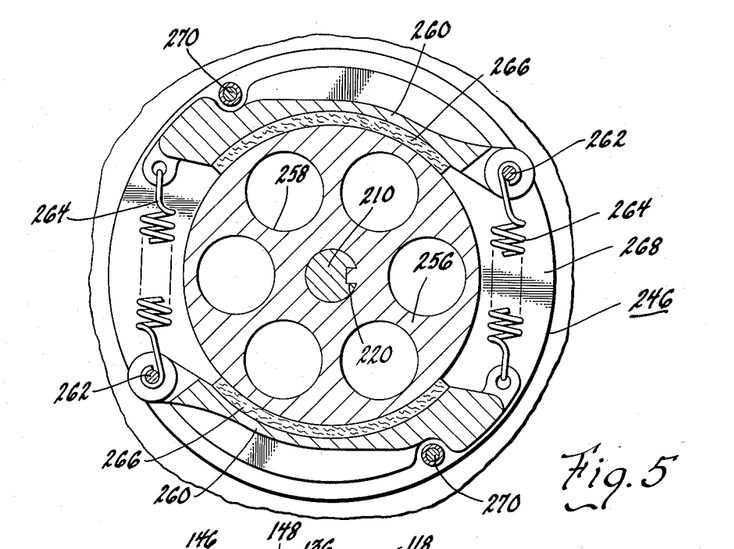
Figure 5 is a sectional view taken along line 5—5 of Figure 2 showing the operating elements of the low agitate speed centrifugal slip clutch.

The centrifugal clutch-and-pulley assembly will best be understood with reference to Figs. 2 and 5 wherein the centrifugal clutch 246 includes a support plate 248 formed with an attachment flange 249 having an opening to receive the depending flange 244 of pulley 214. A disc or washer of friction material 250 of any suitable type lies between the lower surface of pulley 214 and the flange 249. A friction disc 252 of the same or similar material lies in juxtaposition to the flange 249 oppositely disposed from friction disc 250. A washer 253 and a tensioning spring 254 complete the assembly of the centrifugal clutch housing 248 on the pulley flange 244. With this construction, the support housing 248 is held on the pulley flange 244 in a manner to absorb shocks which occur suddenly between the pulley and the support housing. This arrangement prevents damage which might otherwise occur upon sudden acceleration of either pulley 214 or housing 248 relative to each other. However, the sandwiched connection is sufficiently tightened by spring 254 to permit a driving relationship between these members 214 and 248 upon the steady application of any driving force. Arranged beneath the clutch support housing 248 and keyed to motor shaft 210 is a sintered iron drum 256 (Fig. 5). The drum 256 may be lightened and balanced by any suitable hole such as 258 and serves also to retain those portions of the drive assembly thereabove on the motor shaft 210, a spacer sleeve 257 acting to separate drum 256 and bearing inner race 217. Peripherally arranged about the drum 256 and adapted to rotate with support plate or housing 248 are two clutch shoes 260 pivotally mounted on the support housing 248 at 262 and each biased by springs 264 against the outer cylindrical surface of drum 256. Friction material 266 is bonded to the radially inner face of the clutch shoes 260 and provides the frictional material necessary to effect a dragging or braking action between the clutch shoes 260 and drum 256. The support housing 248 is formed also with a bottom housing portion 268 held in spaced relation to upper housing 248 by rivets 270 and pivot pins 262. The pins or rivets 270 serve also as abutments to prevent excessive radially outer travel of brake shoes 260. The springs 264 are so tensioned that they permit the clutch shoes 260 to slip on the surface of drum 256 at two-thirds the rotational speed of the motor shaft 210. That is, with the drum 256 keyed to motor shaft 210, the drum will rotate pulley 214 through a frictional engagement with the clutch shoes 260 which are a part of the centrifugal clutch plate assembly 246. However, as the clutch plate housing 248 and attached clutch shoes 260 accelerate, centrifugal force will lessen the pressure exerted by the pivotally mounted clutch shoes 260 against the drum 256 until a sufficient slippage occurs between drum and clutch shoes to cause the pulley 214 to rotate at two-thirds the speed of drum 251 and motor shaft 210. It should be understood, of course, that the rotational speed of drive pulley 214 relative to motor shaft 210 depends on two factors, viz. the frictional resistance between clutch shoes 260 and drum 256 as governed by the bias of springs 264 and friction material 266, and the speed of motor 67. In this arrangement, a single-speed reversible motor operating at 1,725 r.p.m. will be effective to drive pulley 214 through the centrifugal clutch 246 in a manner to effect a slow speed agitation of 220 strokes per minute. It is well to repeat at this point the driving relationship between clutch housing 248 and pulley 214. This sandwiched friction disc connection between the cutch plate housing 248 and the bottom surface of pulley 214 acts as a shock absorber in the abnormal situation where the clutch 225 is suddenly engagingly dogged to pulley 214 while the latter is idling at a high rate of speed. Such a situation would occur when the selector clutch 225 moves immediately from engagement with high speed spin pulley 212 into engagement with smaller pulley 214. It should be emphasized that no slippage will occur along the sandwiched connection 250, 248, 252 under normal operation due to the force applied to hold the connection rigid by spring washer 254.

It should now be apparent that the speed with which agitate and spin mechanism housing 60 is rotated depends on the driving means selected by shifter clutch 225. The three driving speeds capable of being produced by the structure described hereinbefore in connection with a single speed motor are initiated as follows: (1) a high speed spin (850 r.p.m.) through pulley 212, (2) a low speed spin (330 r.p.m.) and a high speed agitate (330 strokes per minute) through pulley 214 and (3) a slow speed agitate (220 strokes per minute) through centrifugal slip clutch 246 and pulley 214. To select any one of these three situations, selector clutch 225 is either raised into frictional engagement with pulley 212, lowered into dogged engagement with pulley 214 or held in a neutral intermediate position wherein motor shaft 210 drives pulley 214 through the centrifugal clutch 246.

Figures 3, 6:
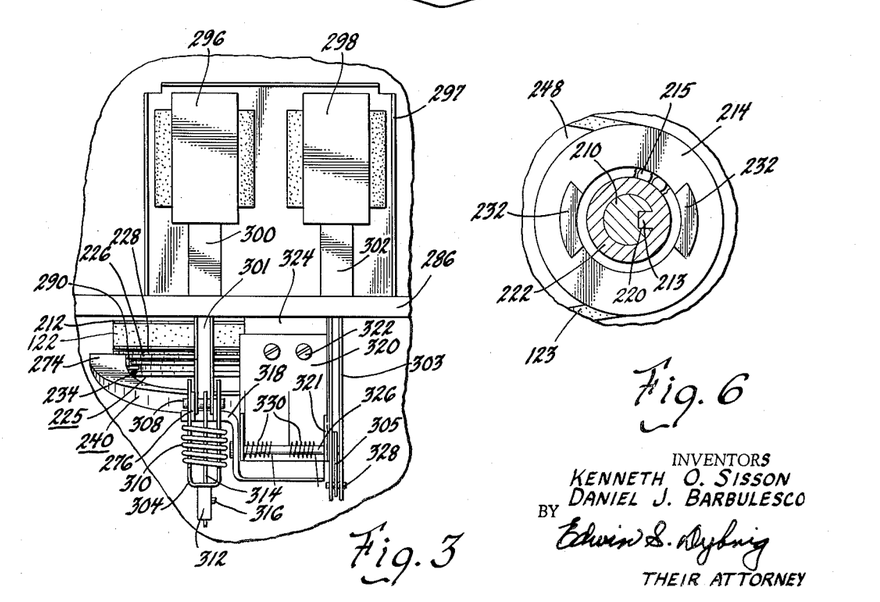
Figure 3 is an elevational view taken along line 3—3 of Fig. 2 showing the clutch shifter fork three-position actuating mechanism.
Figure 6 is a sectional view taken along line 6—6 looking in the direction of the arrows to show the dog drive configuration on the top surface of one of the driving pulleys.
Figure 4:
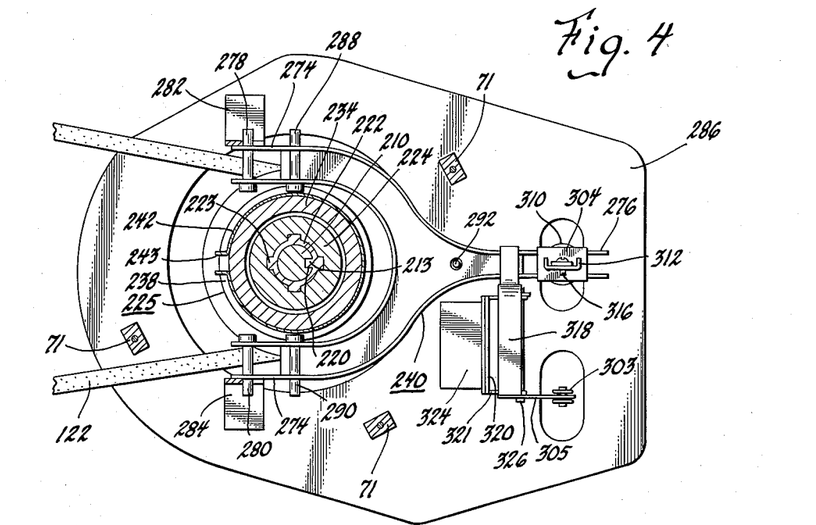
Figure 4 is a sectional view taken along line 4—4 of Figure 2 showing the shifter fork relationship to its actuating mechanism and the selector clutch.

The location of the selector clutch 225 in any of these three positions will now best be understood with reference to Figs. 2, 3 and 4. The shifter fork 240 is formed with a pivoting and shifter clutch engaging bifurcated end portion 274 and an actuating lever end portion 276. Pins 278 and 280 lie within slots in brackets 282, 284, respectively, which are attached to a motor mounting bracket 286. Thus, shifter fork 240 is arranged to pivot about pins 278 and 280 in response to any vertical movement of fork ends 276. Engaged within annular groove 238 on shifter clutch member 234 are pins 288, 290 held also in the outer bifurcated portion 274 of shifter fork 240. As aforesaid, a ring 242 is interposed between the ends of pins 288 and 290 and the bottom of annular groove 238 to retain the shifter clutch portion 234 relatively fixed in relation to the shifter fork 240. This arrangement reduces noise which could occur if clutch member 234 rotates past the fork pins 288 and 290 and will also reduce wear on clutch member 234. Intermediate the end portions 274 and 276 of the shifter fork 240 is a pin 292 extending between the motor mounting bracket 286 and the shifter fork 240. A spring 294 surrounds the pin or rod 292 in a manner to bias apart the shifter fork 240 and motor mounting bracket 286. In this fashion the shifter fork 240 will be continuously biased downwardly, thereby tending to doggedly engage the selector clutch 225 with pulley 214. Of course, the biasing action of spring 294 could be incorporated at any point along the shifter fork 240 between the actuating point for the fork and the fork's bifurcated end portion.

The means whereby the lever end 276 of shifter fork 240 and thereby shifter clutch 225 is positioned will now be described in connection with Figs. 2, 3 and 4. The clutch shifter 240 is arranged to be positioned by the action of two solenoids 296, 298 mounted through a support bracket 297 to the motor bracket 286. The solenoid 296 has an armature 300 attached to a link 301 and arranged to lift the shifter fork 240 to initiate a spinning function through pulley 212 and will be hereinafter called a spin solenoid. On the other hand, solenoid 298 is adapted to have its armature 302, through links 303, 305 and 318, retain the shifter fork 240 in a neutral position thereby to initiate a slow speed agitate and will hereinafter be referred to as an agitate solenoid.

The lever end 276 of shifter fork 240 is pinned to a U-shaped bracket 304 having an elongated slot 306 arranged to receive a pin 308 which loosely connects the shifter fork 240 to the armature link 301 of the spin solenoid 296. For adjusting the tension with which the shifter clutch 225 and friction disc 228 engage the bottom surface of spin pulley 212, a spring 310 is arranged around a portion of bracket 304. To adjust the tension of spring 310, a U-shaped bracket 312 is slidingly attached to a central link 314 running between shifter fork connecting pin 308 and the bracket 312. A set screw 316 goes through an elongated slot 319 in the bottom of link 314 and is threadedly engaged in bracket 312. Thus, to adjust the tension with which the selector clutch 225 engages pulley 212 the set screw 316 is loosened, the U-shaped bracket 312 forced upwardly to increase or decrease the compression on spring 310 and the set screw 316 retightened. Thus, with spin solenoid 296 energized, armature 300 is pulled into lift shifter fork 240 and thereby shifts clutch 225 into driving engagement with pulley 212. When solenoid 296 is disengaged, spring 294 forces the shifter fork 240 downwardly tending toward dogged engagement with pulley 214.

Where a slow speed agitate is desired, shifter clutch 225 must be held in a neutral position intermediate the clutch engaging surfaces of pulleys 212 and 214. For this purpose, the agitate solenoid 298 is adapted to rotate the bellcrank or neutral positioning arm 318 beneath the actuating lever end 276 of the shifter fork 240 whereby the arm 318 is moved into blocking engagement with the lever end 276. The linkage system necessary to accomplish this neutral positioning is supported on a bracket 320 bolted as at 322 to a bracket 324 depending from the motor mounting bracket 286. The bracket 320 is formed with outwardly extending ears 321 ported to receive a neutral arm pivot pin 326. The neutral positioning arm 318 is affixed to one end of the pivot pin 326, the other end of which is rotatably actuated by link 305 affixed thereto. The link 305 is pinned to the actuating link 303 of solenoid 298 and thereby arranged for operation of the arm 318. Springs 330 surround the pivot pin 326 in a manner to bias the bellcrank neutral arm 318 into its neutral position, shown in Fig. 2. Thus, when agitate solenoid 298 is energized, the bellcrank neutral arm 318 is pivoted free of the shifter fork 240 and the shifter clutch 225 is thus permitted to doggedly engage the drive pulley 214 in response to the bias of spring 294.

Figure 10:
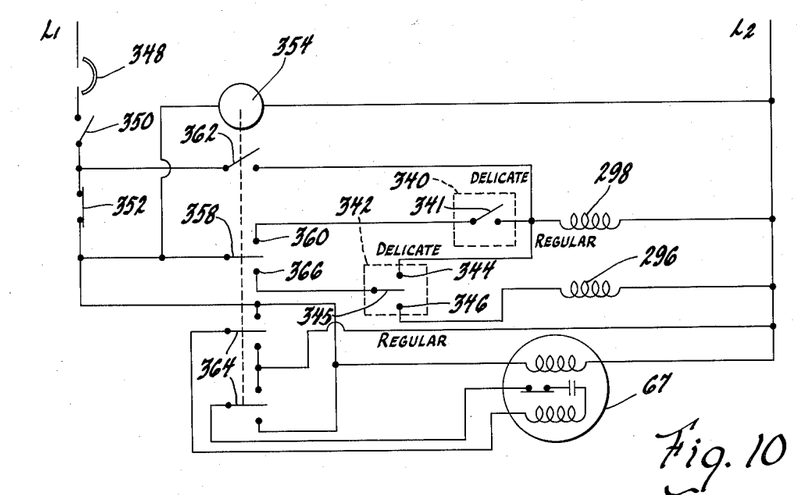
Figure 10 is a schematic wiring diagram illustrating one manner in which the driving arrangement of the invention may be operated.
Figure 11:
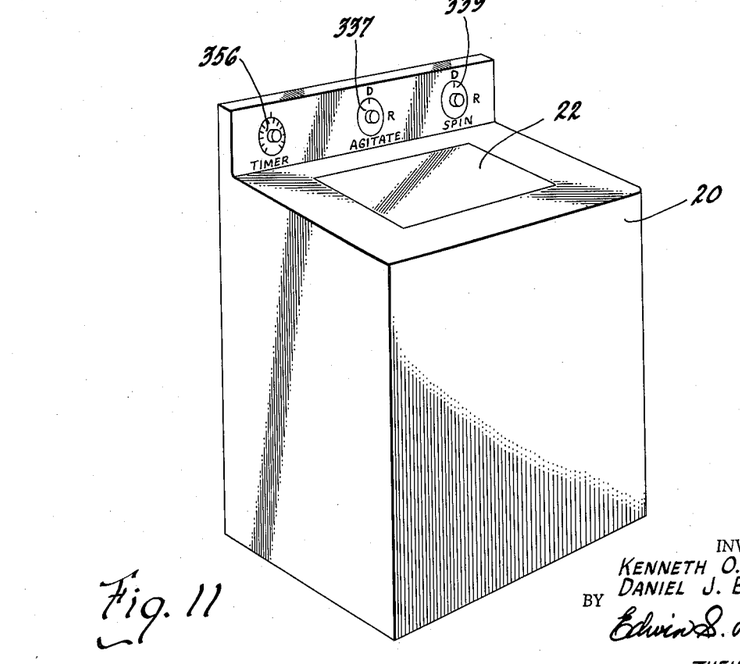
Figure 11 is a prespective view of a washing machine provided with this invention and a control panel therefor.
Figure 12:
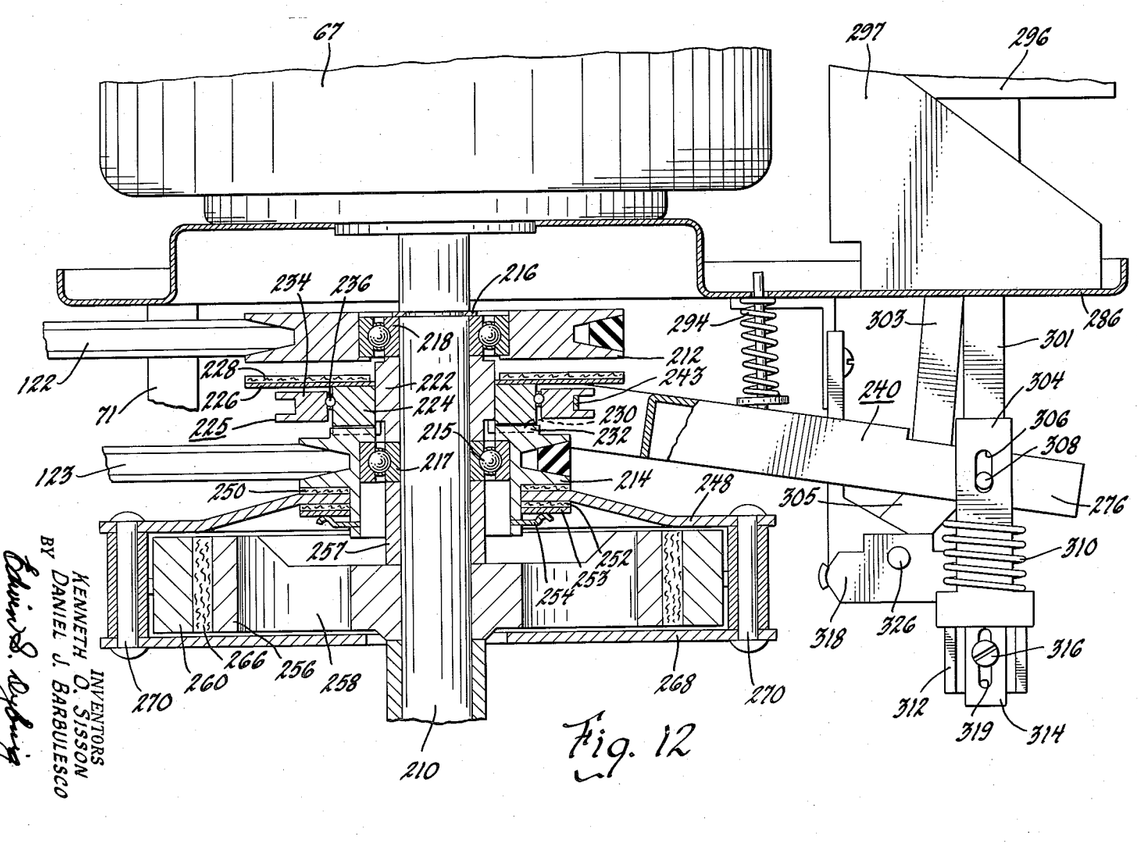
Figure 12 is an enlarged sectional view of the clutching arrangement shown in Figure 2 with the section taken along a line through the pins 270 in Figure 5.
Figure 13:
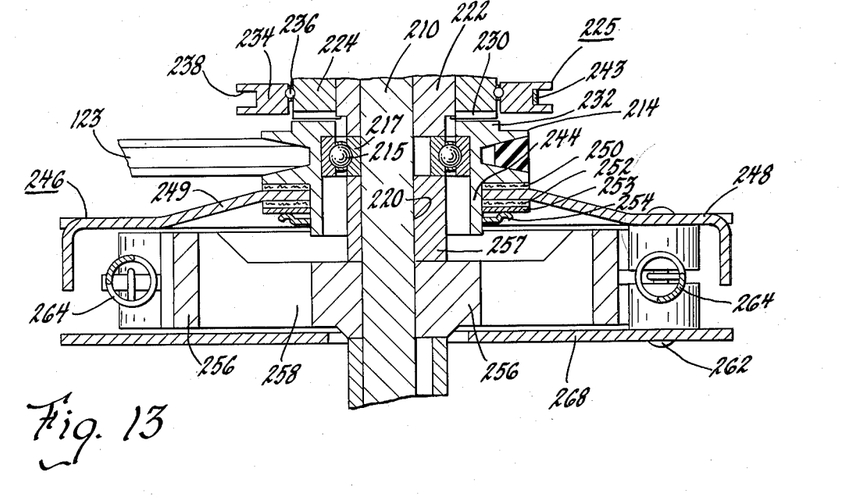
Figure 13 is an enlarged sectional view of the selector clutch and slip clutch seen in Figure 2.
Figure 14:
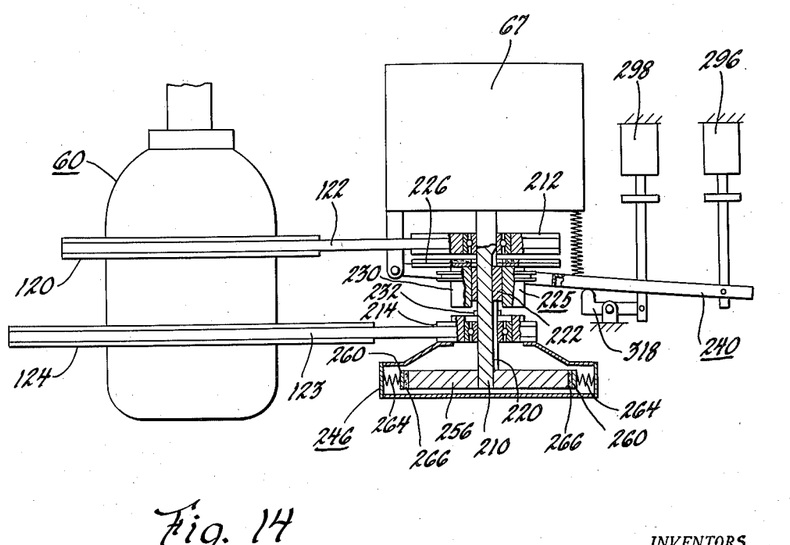
Figure 14 is a schematic drawing of the clutching arrangement of this invention.

The functioning of this multi-speed washing machine system is believed best understood in connection with an operational cycle of the machine as best set forth in the simplified wiring diagram of Fig. 10. In this regard, a load of clothes or other material may be placed within the tub 46 by an operator who will then select upon a dial 337 the desired wash or agitate speed and on dial 339, the desired spin speed—depending on whether the fabric being washed is of a "regular" or a "delicate" nature. In this regard, the agitate switch 340 includes a single-pole, single-throw switch wherein an open position indicates a delicate washing action and a closed position, a regular washing action. The spin switch 342 includes a single-pole, double-throw switch wherein a contact 344 is engaged by a blade 345 for a delicate or low-speed spin and a contact 346 for a regular or high-speed spin. The switches 340 and 342 are adapted to control the operation of selector clutch solenoids 298 and 296, respectively. The simplified wiring diagram of Fig. 10 includes the conventional overload safety protector 348 for motor 67, an on/off switch 350 and a lid switch 352 adapted to terminate the operation of the washing machine whenever lid 22 is opened. A timer motor 354 is arranged to operate whenever the switches 348, 350 and 352 are closed and thus operates a conventional cam actuated timer switch arrangement to produce the various functions occurring during a washing cycle.

Let us assume, for purposes of illustration, that the user has selected a slow or "delicate" agitate speed and a slow or "delicate" spin speed. The washing machine is placed in operation by turning the timer dial 356 to an "on" position. This will set in motion the timer motor 354 to selectively operate the timer switches in accordance with the operation of the washing cycle in operation. Water will first be admitted to fill laundry tub 46 through any conventional valving arrangement 357 for the period designed into the timer. A timer switch 358 will engage a contact 360 to place the agitate selector switch 340 in series control of agitate solenoid 298. Since the "delicate" position for switch 340 has placed the switch blade 341 in an open position and since timer switch 358 is engaged with contact 360, and since timer spin start bypass switch 362 is open, neither solenoid 296 nor 298 will be energized. With agitate solenoid 298 thus deenergized, the shifter fork 240 will be held in a neutral position by the blocking action of bellcrank 318. From structure described hereinbefore, it should be recognized that springs 330 installed around the bellcrank actuating pin 326 impose a continuous bias to the bellcrank 318 to effect a blockage in the path of the shifter fork end portion 276 whenever solenoid 298 is deenergized. With the shifter fork 240 thus blocked by bellcrank 318 against the downward bias of spring 294, the shifter clutch 225 will be retained in an intermediate or neutral position between driving pulleys 212 and 214. The motor shaft 210 will continue to rotate the splined clutch sleeve 222 but the inner race 224 of clutch bearing 236 will merely idle within the shifter clutch 225. Thus, a structural relationship is established wherein the driving pulley 214 is rotated through the centrifugal slip clutch 246. In particular, motor shaft 210 rotates the slip clutch drum 256 keyed thereto. The rotation of drum 256 is transferred to the clutch housing 248 through clutch shoes 260 and from the housing 248 through the shock resistant connection 249, 250 and 252 to the driving pulley 214. As motor 67 accelerates, a rotational speed of slip clutch housing 248 will be reached at which point clutch shoes 260 relax their grip on drum 256 sufficiently to provide a slippage therebetween. In the design relationship described in connection with the slip clutch 246 a speed reduction of one-third will result between the motor shaft 210 and the driving pulley 214. At this reduced speed, driving pulley 214 will rotate pulley 124 through V-belt 123 to initiate a slow or delicate agitation of 220 strokes per minute within the tub 46.

After a predetermined period in accordance with the progress of timer motor 354, the washing action will cease, and a "delicate" spin cycle initiated by the automatic repositioning of timer switch 358 and motor reversing switches 364. In this relationship, switch 358 will now engage a spin selector contact 366 to place the spin selector switch 342 in series control of either agitate solenoid 298 or spin solenoid 296, depending on the setting chosen on switch 342. Since the operator has selected a "deliacte" or slow spin, the selector switch blade 345 is in engagement with contact 344, and agitate solenoid 298 is energized. The circuit to spin solenoid 296 is broken and thus solenoid 296 is deenergized. In accordance with the structure recited hereinbefore, the energization of solenoid 298 will pivot the bellcrank neutral positioning arm 318 out of blocking engagement with shifter fork 240 and the shifter clutch 225 will be placed in dogged engagement with pulley 214. Since the rotation of motor 67 has been reversed in accordance with the reversed positioning of timer switches 364, the rotatable housing 60 will again be rotated by pulley 214, V-belt 123 and pulley 124 in a manner to cause the tub spin shaft 42 to be rotated. Since the tub 46 is affixed to the top portion of spin shaft 42, a low speed spinning operation will be effected. Water will then be spun from the tub 46 through apertures 50 and will collect in the portion of tub 28 above the partition 30 from which point it may be pumped by motor driven pump 69 to any convenient remote drain.

Let us now assume the operator has selected a fast or "regular" agitate on dial 340, and a fast or "regular" spin on dial 342. As before, the overload switch 348, the on/off switch 350 and the lid switch 352 will be assumed in a closed position. After the tub 46 has received an amount of water through valving arrangement 358 in accordance with the timing of the timer motor 354, an agitate cycle will be initated by the timer positioning of switch 358 in engagement with contact 360. In this instance, however, agitate selector switch blade 341 is closed to energize agitate solenoid 298. At this time spin selector switch 342 and spin solenoid 296 are removed from the circuit due to the engagement of timer switch 358 with contact 360. With solenoid 298 thus energized, the neutral positioning arm 318 is pivoted out of blocking engagement with shifter fork 240. The shifter clutch 225 which moves in response to the positioning of shifter fork 240 is then forced downwardly by the bias of spring 294 into dogged engagement with the protuberances 232 on pulley 214. The motor 67 is thus conditioned to drive pulley 214 directly from shaft 210, spacer sleeve 222, shifter clutch member 224 and pulley 214 through belt 123 to driven pulley 124. The agitate and spin mechanism housing 60 is thus rotated in a direction to produce an agitating action.

In accordance with the progress of timer motor 354, a "regular" or high speed spin cycle will be initiated by the automatic closing of timer spin start bypass switch 362. At the same time, motor reversing timer switches 364 will change for spin operation. Since the operator has selected a "regular" or high speed spin, the switch blade 345 will be in engagement with contact 346 and a circuit conditioned to be completed through spin solenoid 296 as soon as timer switch 358 contacts 366. As aforesaid, this invention includes a wiring arrangement wherein the spin cycle is always initiated in low speed. Thus, in accordance with the closing of timer switch 362, solenoid 298 is energized before timer switch 358 engages contact 366 and while switch 358 is in a neutral position between contacts 360 and 366. The bellcrank or neutral positioning arm 318 is pivoted out of blocking engagement with the shifter fork 240 which is then biased downwardly by spring 294. The downward bias of fork 240 places the shifter clutch 225 in dogged driving engagement with drive pulley 214 which drives pulley 124 in a spin producing direction. After a timer period designed to build up the rotational inertia of tub 46 and to remove most of the water from the tub, timer switch 362 is opened to deenergize solenoid 298 and the timer switch 358 engages contact 366 to energize spin solenoid 296. Armature 300 through link 301 will thus lift shifter fork 240, thereby frictionally engaging the clutch disc 226 with the bottom surface of drive pulley 212 and, through V-belt 122, driven pulley 120. In response thereto, the housing 60 is rotated faster to increase the spinning action of tub 46 from low speed to high speed. Water will continue to spin from the tub 46 through apertures 50 and will be removed from the area above bottom bulkhead 30 in accordance with conventional timer regulation of pump 69.

It should now be apparent that the operator may select agitate and spin speeds as desired and may include slow spins with fast agitates and vice versa in accordance with the novel concepts here proposed. It should be equally apparent that the separate controls embodied in separate speed selector switches 340 and 342 could as well be designed into a single switch wherein one setting prescribes both agitate and spin speeds.

The foregoing description has been directed to a driving arrangement whereby two agitate and two spin speeds are obtainable from a single speed reversible motor. The desired end result is also obtainable in a direct approach to the problem, viz. utilizing a two speed reversible motor. Such an approach eliminates those components associated with the centrifugal clutch 246 and the neutral positioning of the shifter fork 240. Thus (and with reference to Fig. 1), if a 4–6 pole two speed reversible motor were substituted for the single speed reversible motor 67, the resultant slow and fast spin action of 330 r.p.m. and 850 r.p.m. and the slow and fast agitate action of 220 and 330 strokes per minute are effected as follows. Slow or 220 strokes per minute agitate is accomplished with the motor in a 6-pole arrangement and driving through shifter clutch 225 which is spring biased into dogged engagement with pulley 214. For a slow spin of 330 r.p.m. the motor is reversed and operated in the high speed or 4-pole arrangement—still driving through a dogged shifter clutch engagement with pulley 214. Again reversing the motor, but retaining the same driving relationship and the 4-pole running windings in the motor circuit, will produce the regular or 330 strokes per minute agitation. For high speed spin, 850 r.p.m., with the motor operating in the spin direction on the 4-pole run windings, the solenoid 296 is energized to cause the shifter fork 240 to lift the clutch 225 into friction drive engagement with the large diameter driving pulley 212. It should now be apparent that only the slow agitate is effected by operating the motor in a 6-pole arrangement. The remaining functions of fast and slow spin and fast or regular agitate result with the motor in a 4-pole running condition and rotating in the direction to produce the desired function.

While the embodiment of the present invention as herein disclosed constitutes a preferred form, it is to be understood that other forms might be adopted.

What is claimed is as follows:

1. In combination, first and second shaft means concentrically arranged, one of said shaft means being solid, said shaft means having an upper and lower end, an enclosing housing completely enclosing the lower end of said shaft means, the upper end of said shaft means protruding out of said housing, means preventing relative rotation of said first and second shaft means, said housing including a stationary portion enclosing said shaft means and a rotatable portion rotatable with respect to the stationary portion, said housing being provided with a substantially sealed joint between the two portions, both of said shaft means being rotatably mounted with respect to both of said portions of said housing, means connecting and disconnecting said first shaft means alternately to said stationary portion and to said rotatable portion, reciprocating means located entirely within said rotatable portion and connecting said rotatable portion and said second shaft means, first and second driven pulleys on said rotatable portion; and means for rotating said rotatable portion in opposite directions relative to the stationary portion, said rotating means including a prime mover and first and second driving pulleys relatively rotatably carried on said prime mover in respective coplanar driving relationship to said first and second driven pulleys; and a shiftable clutch axially movably mounted between said first and second driving pulleys and rotatable with said prime mover; said shiftable clutch having a first driving pulley frictional engaging surface and a second driving pulley engaging dogged surface and means for selectively engaging said frictional and dogged surfaces with said first or second driving pulley respectively for directly driving said driving pulley at substantially the same speed as said prime mover, and a slip clutch including a support plate shock resistively connected to said second driving pulley for rotation therewith, a plurality of spring biased, centrifugally actuated brake shoes circumferentially and pivotally arranged on said plate, and a drum embraced by said brake shoes and connected to said prime mover for rotation therewith, and means for overriding said selectively engaging means whereby said second driving pulley is slippingly rotated by said drum.

2. In combination, first and second shaft means concentrically arranged, said shaft means having an upper and lower end, an enclosing housing completely enclosing the lower end of said shaft means, the upper end of said shaft means protruding out of said housing, means preventing relative rotation of said first and second shaft means, said housing including a stationary portion enclosing said shaft means and a rotatable portion rotatable with respect to the stationary portion, said housing being provided with a substantially sealed joint between the two portions, a double acting overrunning clutch means having means effective in one direction of rotation of the rotatable portion for connecting said first shaft means to said stationary portion and having means effective in the opposite direction of rotation of the rotatable portion for connecting said first shaft means to said rotatable portion, reciprocating means connecting said rotatable portion and said second shaft means for reciprocating said second shaft means through a stroke of at least one inch in response to relative rotation between said second shaft means and said rotatable portion, said housing providing a complete envelope for said reciprocating means and supporting first and second driven members, and reversible power shaft means for driving said driven members, said shaft means including first and second driving members relatively rotatably secured to said shaft in respective juxtaposition to said driven members, and a selector means selectively shiftable between said first and second driving members and adapted to transmit power from said shaft, said selector means having a frictional engaging portion for one of said driving members and a direct engaging portion for the other, and a slip clutch including a support plate attached to one of said driving members, a centrifugally actuated brake shoe pivotally supported on said plate, and a drum rotated by said shaft adjacent said brake shoe, and means for holding said selector means in a neutral position whereby said shaft rotates said driving members through said slip clutch.

3. In combination, first and second shaft means concentrically arranged, said shaft means having an upper and lower end, an enclosing housing completely enclosing the lower end of said shaft means, the upper end of said shaft means protruding out of said housing, means preventing relative rotation of said first and second shaft means, said housing including a stationary portion enclosing said shaft means and a rotatable portion rotatable with respect to the stationary portion, said housing being provided with a substantially sealed joint between the two portions, both of said shaft means being rotatably mounted with respect to both of said portions of said housing, means connecting and disconnecting said first shaft means alternately to said stationary portion and to said rotatable portion, reciprocating means located entirely within said rotatable portion connected between said rotatable portion and said second shaft means and being operable solely by the relative rotation between said rotatable portion and said second shaft means without penetrating the rotatable housing portion, said rotatable housing portion having fixed thereon a plurality of driven pulleys, and a reversible drive means provided with a plurality of driving pulleys in belt drive relationship with said driven pulleys, said driving pulleys mounted relatively rotatably to said reversible drive means, a driving pulley selector mounted on said drive means for rotation therewith; means for drivingly engaging said selector with either of said driving pulleys, means for preventing said selector from engaging either of said driving pulleys, and means for driving one of said driving pulleys more slowly than said reversible drive means.

4. In combination, first and second shaft means concentrically arranged, said shaft means having an upper and lower end, an enclosing housing completely enclosing the lower end of said shaft means, the upper end of said shaft means protruding out of said housing, means preventing relative rotation of said first and second shaft means, said housing including a stationary portion enclosing said shaft means and a rotatable portion rotatable with respect to the stationary portion and said shaft means, said housing being provided with a substantially sealed joint between the two portions, reciprocating means connecting said rotatable housing portion and the innermost shaft means, means connecting and disconnecting the outermost shaft means alternately to said stationary portion and to said rotatable portion, and means for rotating said rotatable portion, said last named means including a first member for rotating said rotatable portion at a first speed, a second member for rotating said rotatable portion at a second speed and a third member for rotating said rotatable portion at a third speed, means for engaging one of said first and second members, and means for overriding said engaging means whereby said third member rotates said rotatable portion.

5. In combination with a washing machine having a mechanism adapted to produce an oscillating-type agitation when rotated in one direction and a spin when rotated in the opposite direction, said mechanism having first and second driven pulleys, means for rotating said mechanism, first and second driving pulleys relatively rotatably carried on said rotating means in respective coplanar driving relationship to said first and second driven pulleys, and a shiftable clutch axially movably mounted between said first and second driving pulleys and rotatable with said rotating means, said shiftable clutch having a first driving pulley frictional engaging surface and a second driving pulley engaging dogged surface and means for engaging one of said frictional and dogged surfaces with one of said first and second driving pulleys for directly driving said driving pulley at substantially the same speed as said rotating means, and a slip clutch including a support plate yieldably connected to said second driving pulley for rotation therewith, a plurality of spring biased, centrifugally actuated clutch shoes circumferentially and pivotally arranged on said plate, and a drum embraced by said clutch shoes and connected to said rotating means for rotation therewith, and means for overriding said engaging means whereby said second driving pulley is slippingly rotated by said drum.

6. In combination with a laundry appliance having a mechanism adapted to effect an oscillating-type laundry operation when rotated in one direction and another laundry operation when rotated in the opposite direction, said mechanism supporting first and second driven members, and reversible powershaft means for driving said driven members, said shaft means including first and second driving members relatively rotatably secured to said shaft in respective juxtaposition to said driven members, and a selector means selectively shiftable between said first and second driving members and adapted to transmit power from said shaft, said selector means having a frictional engaging portion for one of said driving members and a positive engaging portion for the other, and a slip clutch including a support plate attached to one of said driving members, a centrifugally actuated clutch shoe pivotally supported on said plate, and a drum rotated by said shaft adjacent said clutch shoe, and means for holding said selector means in a neutral position whereby said shaft rotates said driving member through said slip clutch.

7. In combination with a laundry appliance having a mechanism adapted to effect an oscillating-type laundry operation when rotated in one direction and another laundry operation when rotated in the opposite direction, said mechanism carrying a plurality of driven pulleys, and a reversible power shaft means provided with a plurality of driving pulleys in belt drive relationship with said driven pulleys, said driving pulleys mounted relatively rotatably to said reversible power shaft means, a driving pulley selector mounted on said power shaft means for rotation therewith; means for drivingly engaging said selector with either of said driving pulleys, means for preventing said selector from engaging either of said driving pulleys, and speed reducing means motion transmittingly connected to said power shaft means for driving one of said driving pulleys more slowly than said reversible power shaft means.

8. A driving arrangement for obtaining multiple speeds from a single speed motor having a shaft including first and second driving pulleys relatively rotatably carried on said shaft and a shiftable clutch axially movably mounted between said first and second driving pulleys and rotatable with said shaft; said shiftable clutch having a first driving pulley frictional engaging surface and a second driving pulley engaging dogged surface and means for selectively engaging said frictional and dogged surfaces with said first or second driving pulleys respectively for driving said driving pulleys at substantially the same speed as said shaft, and a slip clutch including a support plate shock resistively connected to said second driving pulley for rotation therewith, a plurality of spring biased, centrifugally actuated clutch shoes circumferentially and pivotally arranged on said plate, and a drum embraced by said clutch shoes and connected to said shaft for rotation therewith, and means for overriding said selectively engaging means whereby said second driving pulley is slippingly rotated by said drum.

9. In combination, first and second shaft means concentrically arranged, one of said shaft means being solid, said shaft means having an upper and lower end, an enclosing housing completely enclosing the lower end of said shaft means, the upper end of said shaft means protruding out of said housing, means preventing relative rotation of said first and second shaft means, said housing including a stationary portion enclosing said shaft means and a rotatable portion rotatable with respect to the stationary portion, said housing being provided with a substantially sealed joint between the two portions, both of said shaft means being rotatably mounted with respect to both of said portions of said housing, means connecting and disconnecting said first shaft means alternately to said stationary portion and to said rotatable portion, reciprocating means located entirely within said rotatable portion and connecting said rotatable portion and said second shaft means, first and second driven pulleys on said rotatable portion; and means for rotating said rotatable portion in opposite directions relative to the stationary portion, said rotating means including a two speed reversible prime mover and first and second driving pulleys relatively rotatably carried on said prime mover in respective coplanar driving relationship to said first and second driven pulleys; and a shiftable clutch axially movably mounted between said first and second driving pulleys and rotatable with said prime mover; said shiftable clutch having a first driving pulley frictional engaging surface and a second driving pulley engaging dogged surface and means for selectively engaging said frictional and dogged surfaces with said first or second driving pulley respectively for directly driving said driving pulley at substantially the same speed as said prime mover.

References Cited in the file of this patent
UNITED STATES PATENTS

| | | |
|---|---|---|
| 1,935,145 | Davis | Nov. 14, 1933 |
| 2,699,682 | Castner | Jan. 18, 1955 |
| 2,699,683 | Castner | Jan. 18, 1955 |
| 2,699,849 | Foster | Jan. 18, 1955 |
| 2,758,685 | Sisson | Aug. 14, 1956 |
| 2,761,303 | Shelton | Sept. 4, 1956 |
| 2,802,386 | Kirby | Aug. 13, 1957 |
| 2,807,963 | Osterhus | Oct. 1, 1957 |